US008103292B2

(12) United States Patent
Kelly et al.

(10) Patent No.: US 8,103,292 B2
(45) Date of Patent: Jan. 24, 2012

(54) SYSTEM FOR LIMITING USE OF MOBILE COMMUNICATION DEVICES WITHIN A VEHICLE

(75) Inventors: Chuck Kelly, New Berlin, WI (US); John Patrick Looby, Waukesha, WI (US)

(73) Assignee: Tomahawk Systems, LLC, New Berlin, WI (US)

( * ) Notice: Subject to any disclaimer, the term of this patent is extended or adjusted under 35 U.S.C. 154(b) by 457 days.

(21) Appl. No.: 12/404,882

(22) Filed: Mar. 16, 2009

(65) Prior Publication Data

US 2010/0233959 A1 Sep. 16, 2010

(51) Int. Cl.
*H04M 11/10* (2006.01)

(52) U.S. Cl. ...................... 455/456.4; 455/418; 455/419

(58) Field of Classification Search ............... 455/456.4, 455/418, 419, 420
See application file for complete search history.

(56) References Cited

U.S. PATENT DOCUMENTS 6,771,946 B1 * 8/2004 Oyaski .......................... 455/345
7,123,874 B1 10/2006 Brennan

FOREIGN PATENT DOCUMENTS

WO WO02082742 A1 10/2002

OTHER PUBLICATIONS

U.S. Appl. No. 10/326,620, filed Oct. 14, 2004, Witkowski, Todd R. et al.
U.S. Appl. No. 10/273,597, filed Apr. 22, 2004, Martens, Stephen W.
U.S. Appl. No. 11/260,396, filed May 3, 2007, Patterson, Ian M. et al.
U.S. Appl. No. 09/959,749, filed Jan. 13, 2009, Pinault, Francis et al.
U.S. Appl. No. 12/040,820, filed Dec. 11, 2008, Williams, Stephen J.

* cited by examiner

*Primary Examiner* — Daniel D Chang
(74) *Attorney, Agent, or Firm* — Boyle Frederickson, S.C.

(57) ABSTRACT

A system and apparatus for limiting use of mobile communication devices which utilizes vehicle diagnostic information transmitted via the Bluetooth™ communications protocol to a mobile device (PDA, cell phone, laptop, portable printer, GPS, iPod, etc.). If the vehicle diagnostic data meets predetermined criteria, the software configured to evaluate vehicle diagnostic data selectively authorizes telephone calls, incoming text messages, incoming pager messages, incoming e-mails, outgoing telephone calls, outgoing text messages, etc. If the predetermined criteria are not met, the functionality of mobile communication devices will be limited.

20 Claims, 3 Drawing Sheets

SYSTEM FOR LIMITING USE OF MOBILE COMMUNICATION DEVICES WITHIN A VEHICLE

FIELD OF INVENTION

The present invention relates to the field of processing diagnostic data from a vehicle, and in particular using the diagnostic data to control the use of mobile communication devices within a vehicle.

BACKGROUND

There are multiple devices on the market which are used to capture vehicle diagnostic information, and transmit that information, either by hardwire or wireless methods, to other devices. OBD (or ODB-II) is term known in the art referring to a vehicle's self-diagnostic and reporting capability.

Bluetooth™ devices known in the art may be used to communicate with OBD systems. U.S. patent application Ser. No. 10/326,620 is an example of a system integrated that transmits vehicle diagnostic information to other devices utilizing the Bluetooth™ communications protocol.

Additionally, there are multiple patents on the market that are used to block mobile device transmissions using low frequency transmissions or other "cell phone blocking" technologies. One such device, disclosed in U.S. Pat. No. 7,123,874 is wired to a vehicle's electrical system, and determines from readings of vehicle's transmission whether to transmit a blocking signal with a specified radius around a vehicle to preclude cell phone communication.

It is desirable to have an economical means of limiting mobile communications within a vehicle that can be integrated to Bluetooth™ enabled systems already built into some vehicles.

It is further desirable to have a system for limiting mobile communications which does not have to be installed into the transmission, electrical system, or steering column of the vehicle.

It is further desirable to have a system for limiting mobile communications that is allows users to selectively determine which devices are to have limited or functionality, and the extent to which such functionality is to be limited.

GLOSSARY

As used herein, the term "vehicle diagnostic transmitter" means a component which transmits information derived from an engine control module (e.g., an onboard diagnostic computer) to a cell phone.

As used herein, the term "engine control module" or "engine control module interface" means a device which controls and/or provides information about functions of a vehicle in a manner which can be evaluated or interpreted by a user or another device. Vehicle diagnostic data may also include data obtained from a Global Positioning System (GPS) that is mounted within the vehicle, and collects vehicle movement or other vehicle positioning data.

As used herein, the term "vehicle diagnostic data" includes but is not limited to vehicle speed, vehicle transmission state or any other data from a. vehicle, used as a diagnostic tool. Vehicle diagnostic data may also include data obtained from a GPS.

As used herein, the term "communication interface" includes but is not limited to a physical connection, a software protocol, a signal or any other interface on which audio and/or visual data is displayed or communicated.

As used herein, the term "Bluetooth™ device" means any device enabled with the Bluetooth™ wireless protocol for exchanging data over short distances from fixed and mobile devices, creating personal area networks.

As used herein, the term "OBD-II" refers to a vehicle's self-diagnostic and reporting capability.

As used herein, the term "OBD-II port" means the physical interface or connection point for an OBD-II device or system.

As used herein, the term "mobile communication device" means a cell phone, pager, laptop, messaging device, e-mail device, text transmission device, personal digital assistant (PDA) device, portable printer, GPS, iPod, memory device or any other device capable or being used to store or transmit audio or visual communication data.

As used herein, the term "mobile device identification data" any unique or quasi-unique data used to identify a particular mobile communication device or owner of a mobile communication device.

As used herein, the term "network communication capability" means the ability to transmit data over a wireless network.

As used herein, the term "vehicle diagnostic data" means any data related to a vehicle and capable of being measured, captured or transmitted using an OBD-II or any equivalent device known in the art.

As used herein, the terms "movement parameter" or "movement parameters" means any measurable data point or comparable data points related to the movement of a vehicle, vehicle speed, position of the transmission gear (park, reverse, neutral, drive), any vehicle faults which would prevent the vehicle from being operated, and vehicle air bag deployment codes.

As used herein, the term "selectively mounted" means the state of permanently or temporarily securing one object to another device.

As used herein, the term "predetermined criteria" means criteria or parameters specified within a software design to initiate a function or capability or to limit a function or capability.

As used herein, the term "portable communication protocol component device (PCPC)" means any device for exchanging data over short distances from fixed and mobile devices via a personal area network (PAN).

As used herein the term "automobile diagnostic data (ADD) device" means any device capable of reading diagnostic data from an automobile or automobile system.

SUMMARY OF INVENTION

The system and apparatus for limiting use of mobile communication devices described herein utilizes vehicle diagnostic information transmitted via the Bluetooth™ communications protocol to a mobile device (PDA, cell phone, laptop, portable printer, GPS, iPod, etc.) for a specific purpose. When vehicle diagnostic information (e.g. whether the car is in gear, and/or speed of the vehicle) is transmitted to the mobile device, a software application on the device will evaluate the diagnostic information and regulate the functionality of the mobile communication device. In particular, the system described herein utilizes a vehicle diagnostic transmitter capable of transmitting vehicle diagnostic data adapted to receive data from an engine control module communication interface and at least one mobile communication device configured with software to evaluate vehicle diagnostic data and evaluate said vehicle diagnostic data for the purpose for limiting the functionality of the mobile communication device. If the vehicle diagnostic data meets predetermined criteria, the software selectively authorizes telephone calls, incoming text messages, incoming pager messages, incoming e-mails, outgoing telephone calls, outgoing text messages, outgoing pager messages, outgoing e-mails, audio data and visual data.

DETAILED DESCRIPTION OF DRAWINGS

Figure 1:
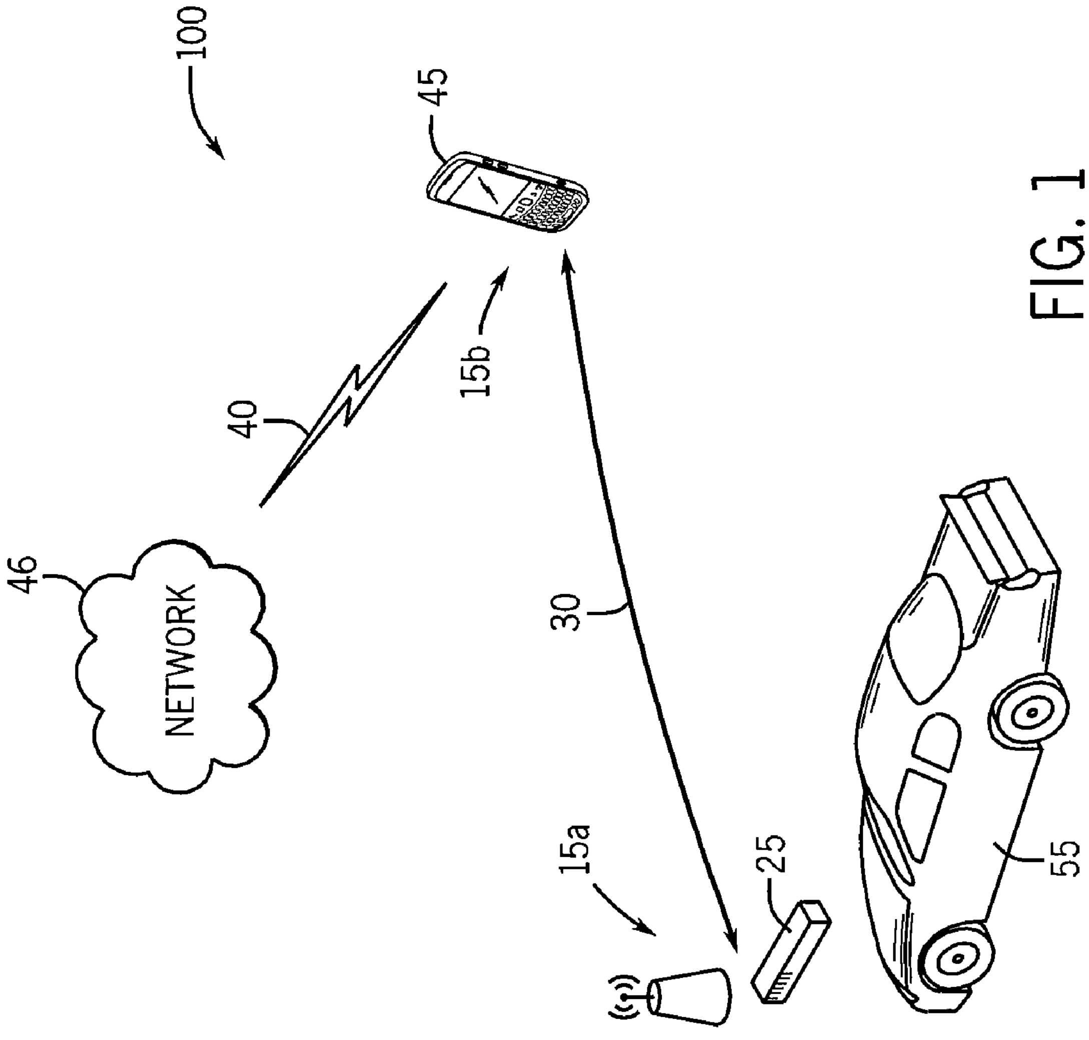
FIG. 1 illustrates an exemplary embodiment of a system for limiting use of mobile communication devices when a vehicle is in motion.

For the purpose of promoting an understanding of the present invention, references are made in the text to exemplary embodiments of a device for regulating mobile communications only some of which are described herein. It should be understood that no limitations on the scope of the invention are intended by describing these exemplary embodiments. One of ordinary skill in the art will readily appreciate that modifications, such as the dimensions of a device for regulating mobile communications, are alternate but functionally similar material(s) from which the device for regulating mobile communications is made. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related. For example, one embodiment of the apparatus and system for limiting the use of mobile communication as disclosed herein may have a range of embodiments and functionality.

FIG. 1 shows an exemplary embodiment of a system for limiting use of mobile communication devices 100 when a vehicle is in motion. The embodiment shown includes portable communication protocol component (PCPC) device 15*a* which may be commonly known in the art is capable of receiving data from an automobile diagnostic data (ADD) device 25. In the embodiment shown, ADD device 25 includes a vehicle diagnostic data transmitter capable of transmitting vehicle diagnostic data, which may also be commonly known in the art. In the exemplary embodiment shown, the PCPC device is a Bluetooth™ enabled device, and the ADD device is an OBD-II device known in the art. In other embodiments, a device using a protocol other than Bluetooth™ including but not limited to IrDA, UWB, Z-Wave and ZigBee and all other protocols which perform a substantially equivalent functions (e.g., 802.11 and 802.15 and equivalent standards) may be utilized. In other embodiments, a device other than an OBD-II protocol device (such as another automobile diagnostic data system for the vehicle and its subsystems) may be used for a vehicle's self-diagnostic and reporting capability.

In the embodiment shown, PCPC device 15*b* maintains open communication channel 30 with mobile communication device 45. In the embodiment shown PCPC device 15 is a cell phone configured with software to evaluate vehicle diagnostic data and evaluate the vehicle diagnostic data for the purpose for limiting the functionality of the mobile communication device if said vehicle diagnostic data meets predetermined criteria (e.g., the car is in motion, or has exceeded a predetermined speed threshold).

In other embodiments, mobile communication device 45 may be a cell phone, pager, laptop, messaging device, e-mail device, text transmission device, personal digital assistant (PDA) device, portable printer, GPS, iPod, memory device or any other device capable or being used to store or transmit audio or visual communication data.

In the embodiment shown, open communication channel 30 is a connection within a personal area network (PAN). A PAN is a computer network used for communication among PAN enabled devices (including mobile communication devices and ADD devices.) In the embodiment shown, reach of a PAN is typically up to 30 meters, but may be of greater distance. In other embodiments, a PAN may have the capability for connecting to a higher level network and the Internet (e.g., an uplink or a website).

In the exemplary embodiment shown, PCPC device 15 is a Bluetooth enabled device™ which is installed in vehicle 55. PCPC device 15 reads data obtained using ADD device 25 (e. g, ADD shift position and wheel speed) using open communication channel 30. When vehicle 55 is in the "drive" position and/or is in motion, network communication channel 40 to network 46 is temporarily interrupted, and the mobile device may not be used. The network communication channel is restored when the vehicle is put into "park" or when the vehicle comes to rest.

In various embodiments, mobile communication device 45 may be selectively configured to limit particular mobile communication device functions, including incoming telephone calls, incoming text messages, incoming pager messages, incoming e-mails, outgoing telephone messages, outgoing text messages, outgoing pager messages, outgoing e-mails, audio data and visual data. For example, mobile communication device 45 may be configured to permit incoming cell phone calls from a parent and outgoing emergency calls, but limit text messaging capability.

In various embodiments PCPC device 15 may be integrated within the vehicle, or separately installed. The identity of one or more mobile communication devices 45 may be registered with PCPC device 15.

Figure 2:
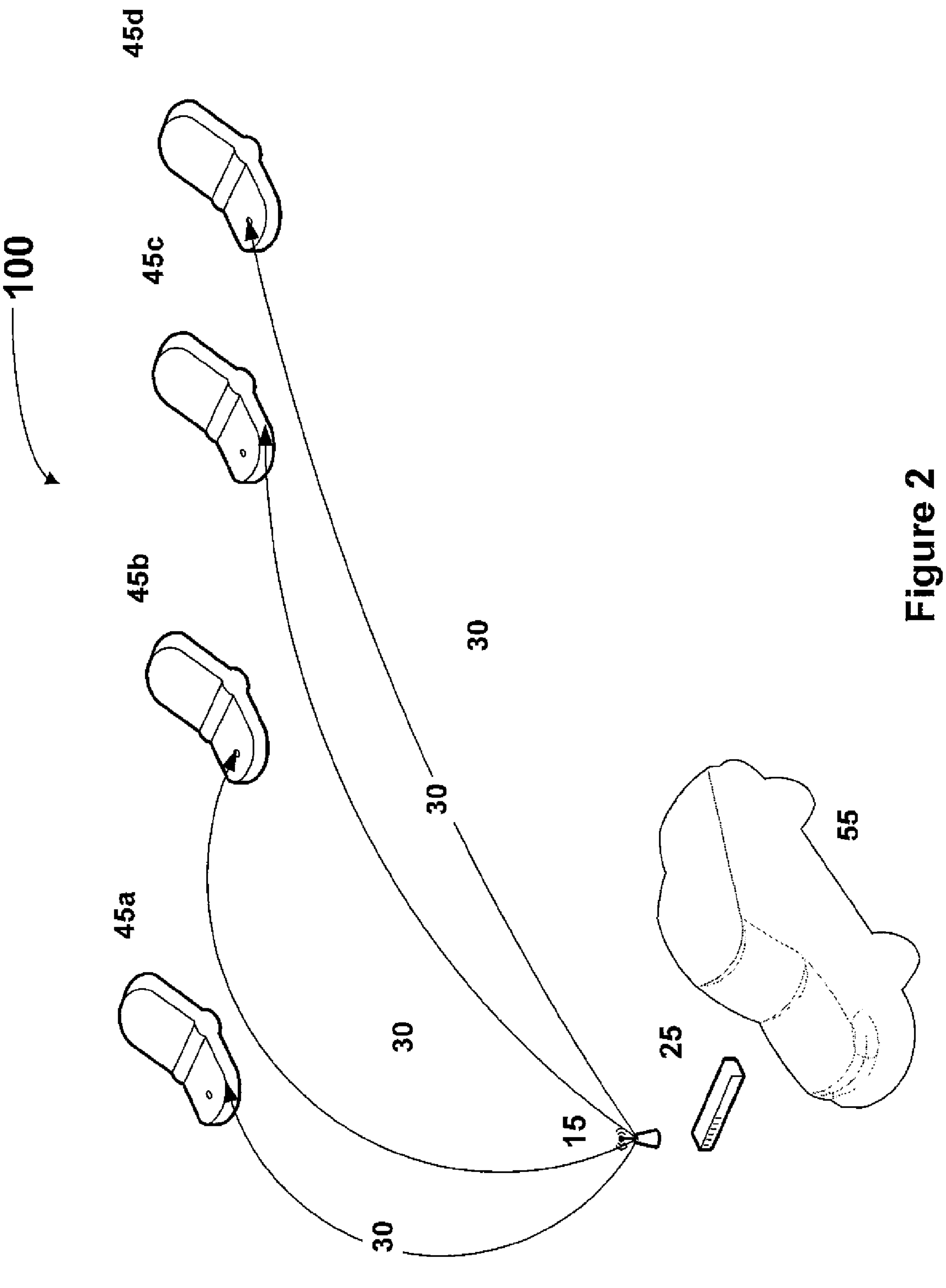
FIG. 2 illustrates an exemplary embodiment of a system for limiting use of mobile communication devices for a fleet of vehicles, in which a single mobile communication device may be registered in multiple vehicles.

FIG. 2 illustrates an exemplary embodiment of a system for limiting use of multiple mobile communication devices 100 within a single vehicle. In the embodiment shown in FIG. 2, multiple registered portable communication devices (45*a*, 45*b*, 45*c* and 45*d*) may be regulated (via device registration) by PCPC device 15 installed within vehicle 55. For example, an employer may regulate the cell phone use of all individuals within a single vehicle.

Figure 3:
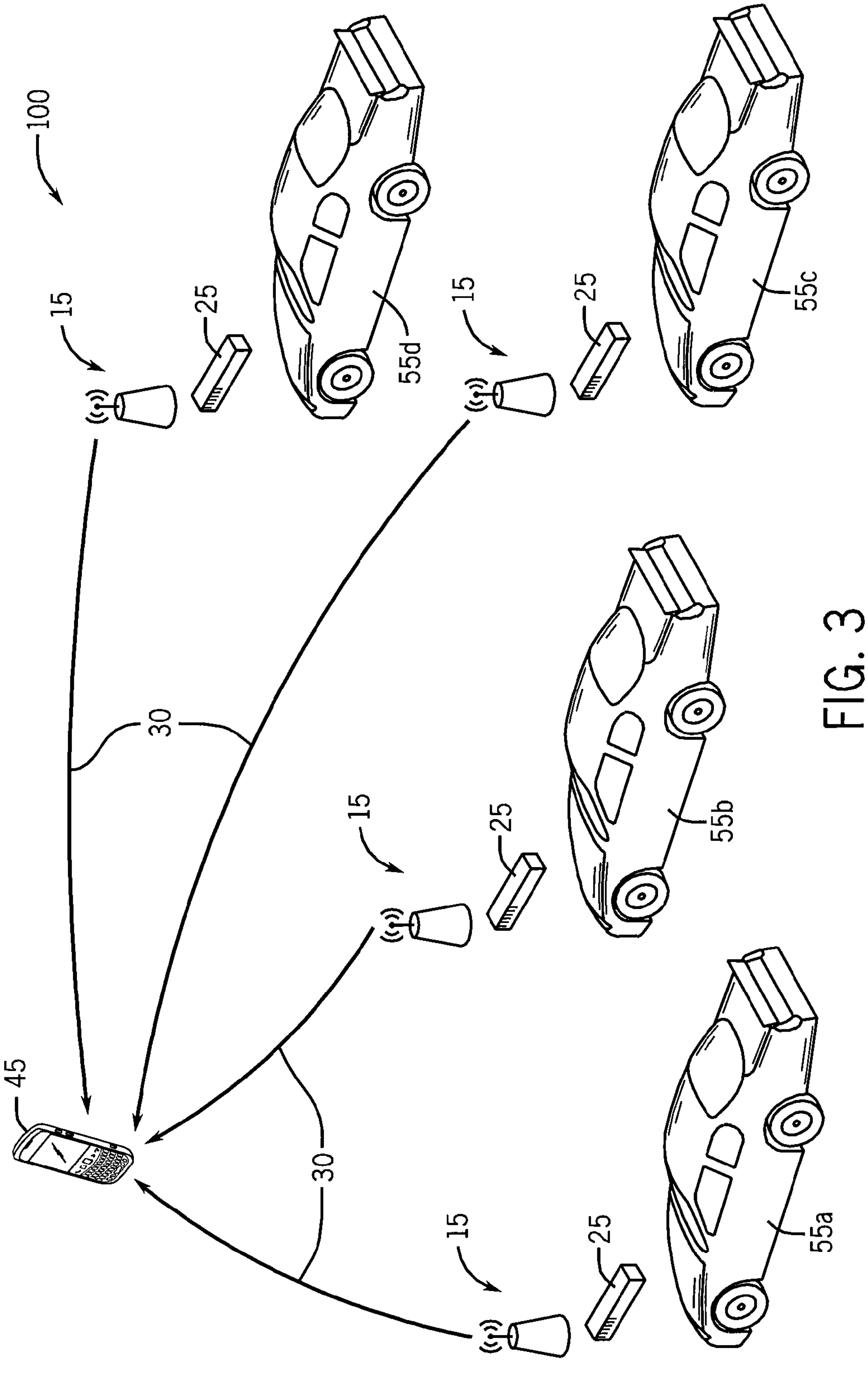
FIG. 3 illustrates a further exemplary embodiment of a system for limiting use of mobile communication devices in which a single mobile communication device may be registered in multiple vehicles.

FIG. 3 illustrates a further exemplary embodiment of a system for limiting use of mobile communication devices 100 for a fleet of vehicles, in which a single mobile communication device may be registered in multiple vehicles (e.g., 55*a*, 55*b*, 55*c*, and 55*d*).

What is claimed is:

1. A system for limiting the use of mobile communication devices within a vehicle comprising:

at least one vehicle diagnostic transmitter capable of transmitting vehicle diagnostic data, said vehicle diagnostic transmitter adapted to receive data from an engine control module communication interface; and at least one mobile communication device configured with software to receive the vehicle diagnostic data transmitted by the vehicle diagnostic transmitter, evaluate vehicle diagnostic data, and limit the functionality of said mobile communication device if said vehicle diagnostic data meets predetermined criteria.

2. The system of claim 1, wherein said engine control module communication interface is a Bluetooth™ device installed on said vehicle.

3. The system of claim 1, wherein said engine control module communication interface is an OBD-II port.

4. The system of claim 1, which further includes a software component which disables a mobile communication device if said vehicle diagnostic data meets predetermined criteria.

5. The system of claim 1, which further includes a software component which limits the network communication capability of said mobile communication device to predetermined phone numbers if said vehicle diagnostic data meets predetermined criteria.

6. The system of claim 1, which further includes a software component which authorizes functions of said mobile communication device if said diagnostic data meets predetermined criteria.

7. The system of claim 1, wherein said vehicle diagnostic data further includes data obtained from a GPS.

8. An apparatus for limiting the use of mobile communication devices within a vehicle comprising:

a receiver adapted to receive vehicle diagnostic data from an engine control module communication interface;

a transmitter capable of transmitting vehicle diagnostic data to at least one mobile communication device configured with software to evaluate vehicle diagnostic data to limit said mobile communication device if said diagnostic data meets predetermined criteria; and a housing which substantially encloses said receiver and said transmitter, said housing further adapted to be mounted within said vehicle.

9. The apparatus of claim 8, wherein said housing is adapted to be selectively mounted within said vehicle.

10. The apparatus of claim 8, wherein said receiver and said transmitter are integrated with said engine control module interface of said vehicle.

11. The apparatus of claim 8, which is further adapted for connection to an OBD-II port.

12. The apparatus of claim 8, which further includes a software component which disables a mobile communication device if said vehicle diagnostic data meets predetermined criteria.

13. The apparatus of claim 8, which further communicates with a software component installed on at least one mobile communication device to limit the network communication capability of at least one mobile communication device if said diagnostic data meets predetermined criteria.

14. The apparatus of claim 8, which further communicates with a software component installed on at least one mobile communication device to authorize functions of said mobile communication device if said diagnostic data meets predetermined criteria.

15. The apparatus of claim 8, which further communicates with a software component installed on at least one mobile communication device to prohibit functions of said mobile communication device, said functions selected from a group consisting of incoming telephones, incoming text messages, incoming pager messages, incoming e-mails, outgoing telephone messages, outgoing text messages, outgoing pager messages, outgoing e-mails, audio data and visual data.

16. A method for regulating the use of a mobile communication device within a vehicle comprised of the steps of:

receiving vehicle diagnostic data from an engine control module communication interface;

transmitting said vehicle diagnostic data to at least one mobile communication device configured with software to evaluate vehicle diagnostic data; and utilizing the software on the mobile communication device to perform the steps of:

evaluating said vehicle diagnostic data on the mobile communication device to determine the movement parameters of said vehicle, comparing said movement parameters to predetermined parameters specified by software stored within said mobile communication device, and limiting the functionality of said mobile communication device if said vehicle diagnostic data meets said predetermined criteria.

17. The method of claim 16, wherein said movement parameters are selected from a group consisting of vehicle travel speed, transmission state air bag deployment codes.

18. The method of claim 17 wherein transmission state is selected from a group consisting of park, drive, neutral, reverse and gear position.

19. The method of claim 16, which further includes the step of limiting the network communication capability of said mobile communication device if said vehicle diagnostic data meets predetermined criteria.

20. The method of claim 16, which includes the step of configuring the said mobile communication device to authorize functions selected from a group consisting of incoming telephones, incoming text messages, incoming pager messages, incoming e-mails, outgoing telephone calls, outgoing text messages, outgoing pager messages, outgoing e-mails, audio data and visual data.

* * * * *